INVENTORS
Carl J. Miller,
Fred F. Timpner &
Hulki Aldikacti
BY
George A. Schmidt
ATTORNEY

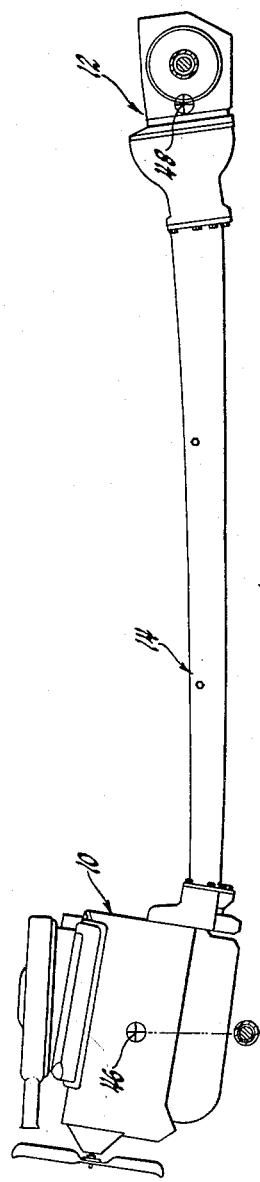
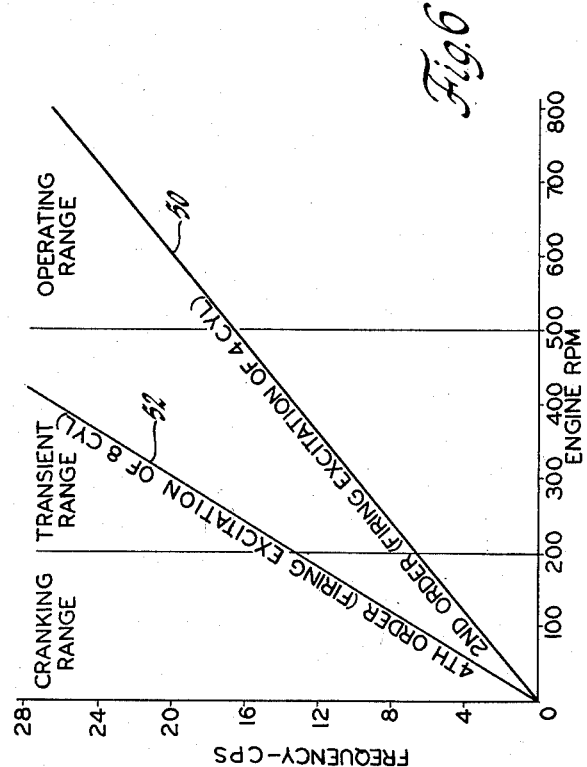
INVENTORS
Carl J. Miller,
Fred F. Timpner &
Hulki Aldikacti
BY George A. Schmidt
ATTORNEY ately along the line 4—4 of FIGURE 1 and looking in the
United States Patent Office 3,167,149
Patented Jan. 26, 1965

3,167,149
TORQUE TUBE HAVING A VARYING SECTION MODULUS
Carl J. Miller, Warren, Fred F. Timpner, Orchard Lake, and Hulki Aldikacti, Royal Oak, Mich., assignors to General Motors Corporation, Detroit, Mich., a corporation of Delaware
Filed Aug. 31, 1961, Ser. No. 135,331
5 Claims. (Cl. 180—70)

This invention relates to a torque tube for a motor vehicle, and more particularly to a torque tube having a varying cross-sectional configuration to permit control of the bending stiffness of the torque tube as well as the resonant frequency of vibration of the torque tube.

In the design and manufacture of vehicles, a "true" torque tube construction has many advantages. By "true" torque is meant the rigid connection between the engine mass at the front axle and the mass at the rear axle, which may comprise the differential unit, transmission or the like. The tube connecting the two masses, if rigidly secured to both, is a true torque tube. It is seen that with such a configuration the masses and the torque tube are a rigid unit and must be so considered for purposes of vibration and vibration suppression.

In order to isolate various frequencies of vibration and to eliminate objectionable disturbances in the system and in the vehicle passenger compartment, it has been the practice in the past to provide a torque tube of extreme strength and rigidity, thus placing the objectionable vibration frequencies into a range above the operating range of the engine. This is impractical from a production and cost standpoint and has prevented extensive use of "true" torque tube constructions.

One of the most critical areas in torque tube design and construction is in proper provisions for beaming and torsional vibrations. In these modes the front and rear masses act as independent masses coupled together by the torque tube. The torque tube supplies all of the flexibility. The following modes are possible:

(1) Vertical beaming, where the front and rear masses pitch against each other and tend to bend the torque tube in a vertical plane.

(2) Lateral beaming, where the front and rear masses yaw against each other and tend to bend the torque tube in a horizontal plane.

(3) Torsional, where the front and rear masses roll against each other and tend to twist the torque tube.

Since the principal axes of inertia of the masses are generally inclined, such as the normal rearward inclination of the vehicle engine, and the torque tube is not attached at the center of gravity of the two masses, all three of the above modes will be coupled together and an excitation to one can be an excitation to all three. All of the above modes are the result of the front and rear masses rotating about their axes. Thus, any disturbance that applies a couple to these masses can excite any and all of these modes.

The device in which this invention is embodied comprises, generally, a torque tube which may be rigidly connected between front and rear masses and which is provided with a varying cross-sectional area. This permits control of the bending stiffness and control of the resonant frequency of vibration of the torque tube. This permits proper design of a useable and economical construction which is extremely simple and inexpensive to manufacture and assemble. Furthermore, the front and rear masses are mounted at the centers of gravity of the masses, also aiding in elimination of certain vibrations which would otherwise be objectionable.

The varying section insures a resonant frequency of vibration of the torque tube and the system which occurs between the cranking and operating speeds of the normal engine and, as such, is not objectionable through either cranking or operating speed ranges. The wheel torque reaction in the vehicle is carried by a vertical load at the engine mounts. This produces a bending moment in the torque tube which is similar to that of a cantilever beam. The bending moment of the tube is a variable, as is the moment of inertia at various points along the length of the tube. By varying the section modulus of the torque tube, the bending stress may be held constant and the bending stiffness of the tube controlled. This in turn permits control of the three vibration modes that are mentioned above. By locating the mass mounts at their centers of gravity, a road shock or disturbance through the vehicle wheels will appear as a pure force to the masses. If the mounts are not at the centers of gravity, a road shock or disturbance will appear both as a force and a couple, the couple being sufficient to excite the vibrations in the system.

These and other advantages will become more apparent from the following description and drawings, in which:

FIGURE 5 is a schematic view of the front and rear masses of a torque tube system connected by a rigid torque tube; and FIGURE 6 is a graph of frequency versus engine r.p.m., showing the curves of various vibration frequencies.

Figure 1:
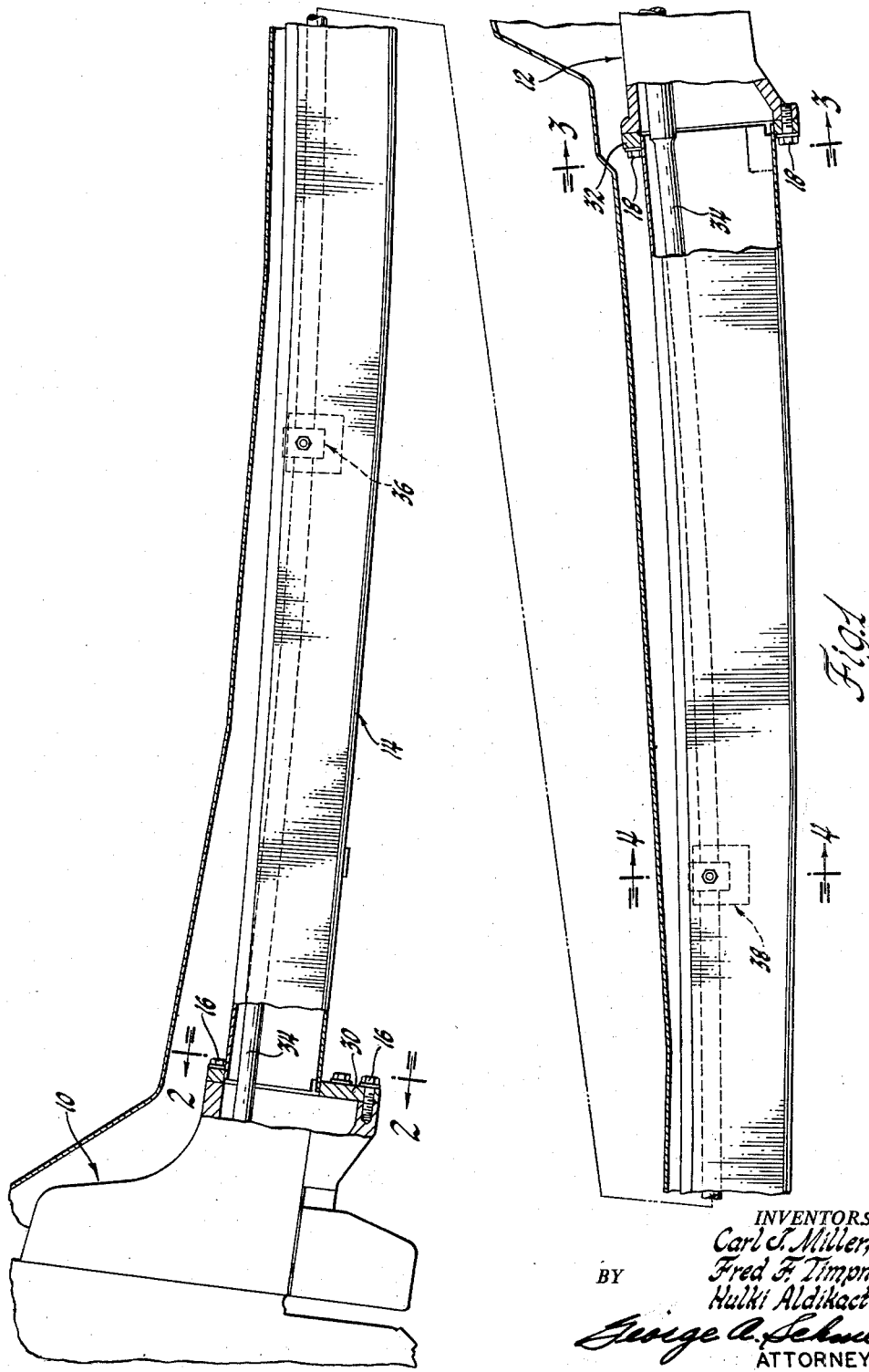
FIGURE 1 is a cross-sectional view of a torque tube system showing the masses at front and rear of a vehicle connected by a rigid tube.

Referring more particularly to the drawings, the varying section torque tube is best shown in FIGURES 1–4. In FIGURE 1 an engine and clutch assembly is illustrated generally by the numeral 10 and is of the type commonly located adjacent the front axles of a vehicle. A rear transmission unit, illustrated generally by the numeral 12, may be located adjacent the rear axle of the vehicle, or the numeral 12 may represent a mass comprising various other components, such as a differential and axle assembly. It is not necessary that the engine be at the front and the transmission at the rear of the vehicle. Both of these structures may be located at the front or at the rear.

Extending between the engine and clutch assembly 10 and the transmission assembly 12 is a rigid torque tube, illustrated generally by the numeral 14. The torque tube is rigidly secured in any suitable manner to the engine assembly 10, as by bolts 16 at its forward end, and is rigidly secured to the transmission assembly 12 in any suitable manner, as by bolts 18 at the rearward end. Torque tube 14 constitutes a rigid connection between the engine assembly 10 and the transmission assembly 12 such as to make all three members 10, 12 and 14 a single unit.

Figure 2:
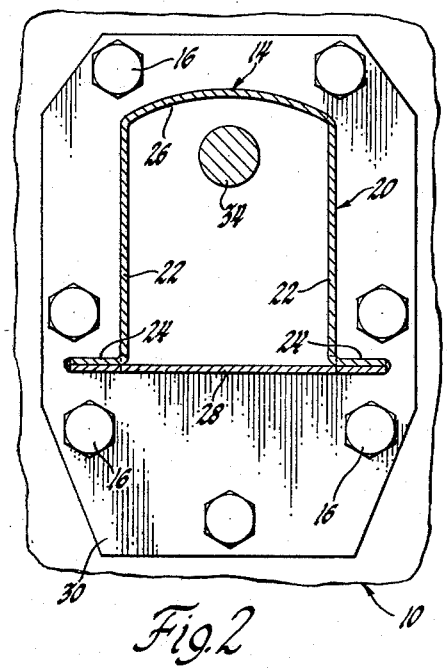
FIGURE 2 is a cross-sectional view of the front end of the torque tube illustrated in FIGURE 1, taken substantially along the line 2—2 of FIGURE 1 and looking in the direction of the arrows.
Figure 3:
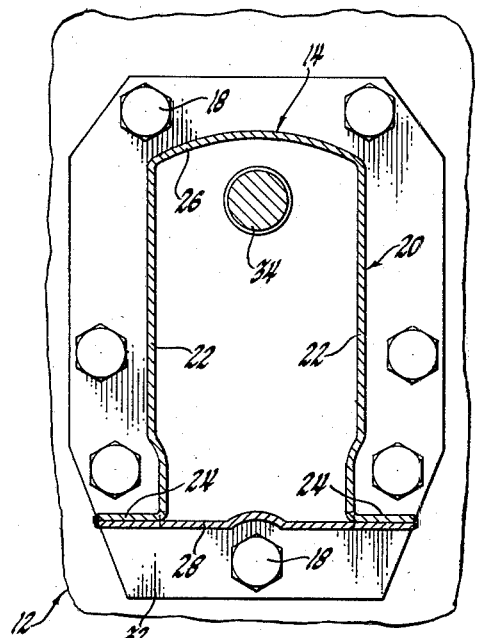
FIGURE 3 is a cross-sectional view of the rear end of the torque tube illustrated in FIGURE 1, taken substantially along the line 3—3 of FIGURE 1 and looking in the direction of the arrows.

FIGURES 2 and 3 best illustrate the specific construction of the torque tube. An upper portion 20 of generally U-shaped configuration has side walls 22 terminating in outwardly directed flanges 24 extending along the length of the tube. An upper wall 26, which is the base of the U-shape may be of any suitable configuration and is shown for illustration purposes to be curved.

This is not necessary to the invention. The torque tube 14 is closed at the bottom by a plate member 28 extending along the length of the torque tube and which is secured in any suitable manner, as by welding, to the outwardly turned flanges 24. With the bottom plate in place a tubular torque tube is presented. A suitable connecting plate 30 may be secured to the front end of torque tube 14 which is in turn secured to the engine assembly housing by bolts 16.

FIGURE 3 illustrates the rearward end of torque tube 14. A suitable connecting plate 32 may be secured in any suitable manner to the torque tube 14, the connecting plate 32 being secured to the transmission housing 12 by bolts 18. FIGURE 3 shows the change in the cross-sectional area of the torque tube when compared with the section illustrated in FIGURE 2. It may be noted that the side walls 22 of the torque tube are greatly increased in height at the rearward end of the torque tube. The distance between the side walls 22, and thus the width of wall 26, may be substantially the same.

In order to form the torque tube 14, a trapezoidal blank may be bent into a U-shape such that the walls will be of varying dimension along the length thereof to provide a torque tube of the nature described. This permits control of the bending stiffness and resonant vibration frequency, as will be hereinafter described.

Figure 4:
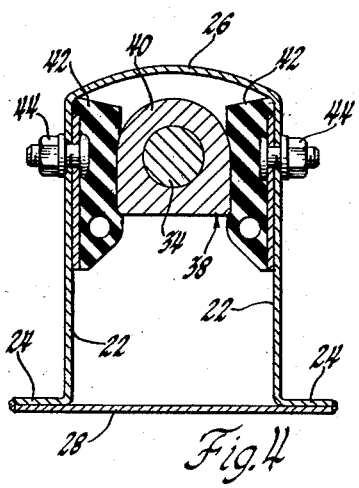
FIGURE 4 is a cross-sectional view through the central part of the torque tube of FIGURE 1, taken substantially along the line 4—4 of FIGURE 1 and looking in the direction of the arrows.

In the particular construction illustrated in the drawings, a curved drive shaft, illustrated generally by the numeral 34, is disposed within torque tube 14, and bearing assemblies 36 and 38 surround shaft 34 and are secured in the torque tube 14. As shown in FIGURE 4, the bearing member 40 is supported in resilient bushings 42 which in turn are secured in any suitable manner, as by nut and bolt assemblies 44 in the walls 22 of the torque tube. Curved shaft 34 is shown only for illustration purposes, it being understood that this is not necessary to the invention. Any drive shaft configuration may be used.

FIGURE 5 illustrates a general system in which an engine and clutch assembly 10 is connected to a rear transmission and axle assembly 12 by means of the torque tube 14. Points 46 and 48 are the centers of gravity, and also the centers of percussion, of the engine 10 and transaxle unit 12, respectively, and these masses are mounted at these points for proper vibration control. As above stated, vibration modes are the result of the engine 10 and transaxle 12 rotating about their axes, and it is easily seen that any disturbance applying a couple to these masses can excite the vibration modes. Since the mounts 46 and 48 are placed at the centers of gravity of the two masses the road shock or disturbance appears as a pure force rather than a force and a couple.

The second order vibration in the system is of particular interest and may be excited by the torque reaction in the engine 10. This resonant vibration can excite the various vibration modes in the system. The torque reaction is not uniform but is composed of several harmonics, the harmonics being multiples of engine frequency. For example, in a four-cylinder engine the second, fourth and sixth order frequencies are the engine torque harmonics. In an eight-cylinder engine the fourth, eighth and twelfth order frequencies are engine torque harmonics. FIGURE 6 is a representation of second and fourth order frequencies, 50 and 52 respectively, versus the engine speed in revolutions per minute. Generally speaking, 200 r.p.m. may be said to be the upper limit of the cranking speed range of the engine, and 500 r.p.m. may be said to be the lower limit of the operating range of the engine. If the resonant frequencies of the system are located in either the cranking range or the operating range, disturbances will be found which will be objectionable. It is thus desired to restrict the resonant frequencies to the transient range between 200 and 500 revolutions per minute. For second order vibrations the frequencies must fall between 7.6 cycles per second and 16.8 cycles per second. For fourth order vibrations the frequencies are between 13.3 cycles per second and a point not illustrated on the curve.

These, of course, are theoretical figures, and as a practical matter limitations of 8–12 cycles per second for the second order frequencies and 16–24 cycles per second for the fourth order frequencies may be the proper limits.

The construction of the varying section torque tube, along with the mounting of the engine and the mass at the rear axle at the centers of gravity thereof, restricts the resonant frequency of vibration to the transient range between 200 and 500 revolutions per minute. Thus, the resonant frequency of vibration does not cause an objectionable excitation of the various vibration modes during either the cranking or operating range of the engine.

Torque tube 14 also overcomes the problems of bending moments produced in torque tube by the wheel torque reaction in the vehicle. Wheel torque reaction is carried as a vertical load at the engine mounts and does not cause a couple exciting the various vibration modes. The bending stress on the torque tube is defined by the following formula:

$$S = \frac{Mc}{I}$$

S is the bending stress, M is the bending moment, c is the distance of the material being considered from the centroid of the cross-sectional area, and I is the moment of inertia of the cross-sectional area. Since $$\frac{I}{c} = Z$$

where Z is the section modulus, a simple substitution in the above formula results in the following bending stress definition:

$$S = \frac{M}{Z}$$

The bending moment M is a variable, since the bending moment in the torque tube is similar to that of a cantilever beam, and in order to maintain the bending stress constant or to control the bending stiffness of the torque tube the section modulus Z may be varied. This is accomplished by the varying cross-sectional area of torque tube 14 between the front and rear, as illustrated by FIGURES 2 and 3 of the drawings. By controlling the bending stiffness or torque tube 14 the vibration frequencies in vertical and lateral beaming, as well as in torsion, are controlled and restricted to a manageable range, such as between 200 and 500 revolutions per minute of the engine.

Thus, a torque tube construction is provided which eliminates objectionable resonant vibrations from causing disturbances in the vehicle. The construction of the torque tube with a varying cross-sectional dimension, permits control of the stiffness of the tube and thus control of vibrations in the system. This, coupled with mounting of the front and rear masses at their respective centers of gravity, contributes to a vibrationally sound and unobjectionable torque tube system which is both practical and economical in modern vehicle manufacture and design.

What is claimed is:

1. In a vehicle having front and rear axles; an engine mounted adjacent the front axle; and a torque tube extending between said engine and said rear axle and rigidly attached to said engine and said rear axle, said torque tube having a gradually increasing cross-sectional area from front to rear thereof to control the bending stiffness and resonant frequency of vibration of said torque tube.

2. In a vehicle having front and rear axles; an engine mounted adjacent the front axle; and a torque tube extending between said engine and said rear axle and rigidly attached to said engine and said rear axle, said torque tube including an upper portion having side walls terminating in outwardly turned flanges along the lower edges thereof and a top wall extending between the upper edges thereof and a bottom plate extending between said side walls and being secured to said flanges, said side walls being of increasing dimension from front to rear of said torque tube to control the bending stiffness and resonant frequency of vibration of said torque tube.

3. In a vehicle having front and rear axles;
a mass mounted at the center of gravity thereof adjacent said front axle;
a mass mounted at the center of gravity thereof adjacent said rear axle;
and a torque tube extending between said masses and rigidly attached thereto, said torque tube including an upper portion having side walls terminating in outwardly turned flanges along the lower edges thereof and a top wall extending between the upper edges thereof and a bottom plate extending between said side walls and being secured to said flanges, said side walls being of increasing dimension from front to rear of said torque tube to control the bending stiffness and resonant frequency of vibration of said torque tube.

4. A torque tube for a vehicle having an engine and a rear axle, comprising:
a tubular member rigidly connecting said engine and said rear axle, the cross-sectional area of said member increasing from front to rear thereof and along substantially the entire length thereof to control bending stiffness and the resonant frequency of vibration of said torque tube.

5. A torque tube for a vehicle having an engine and a rear axle, comprising:
an upper portion of generally U-shaped cross-section extending between said engine and said rear axle;
and a bottom plate extending lengthwise of said upper portion and secured thereto along the edges thereof;
said upper portion having an increasing height from front to rear thereof to control bending stiffness and the resonant frequency of vibration of said torque tube.

References Cited in the file of this patent
UNITED STATES PATENTS

| | | |
|---|---|---|
| 1,272,648 | Ferguson | July 16, 1918 |
| 1,992,496 | Marmon et al. | Feb. 26, 1935 |
| 2,067,287 | Pearce | Jan. 12, 1937 |
| 2,373,356 | Thoms et al. | Apr. 10, 1945 |
| 2,816,616 | Hill | Dec. 17, 1957 |
| 2,906,360 | Daley | Sept. 29, 1959 |

FOREIGN PATENTS

| | | |
|---|---|---|
| 212,532 | Great Britain | Sept. 18, 1924 |
| 441,786 | Germany | Mar. 14, 1927 |
| 574,413 | Germany | Apr. 12, 1933 |
| 1,188,854 | France | Mar. 16, 1959 |